M. B. BROWN.
SELF CLOSING FAUCET.
APPLICATION FILED SEPT. 28, 1916.
1,229,579. Patented June 12, 1917.
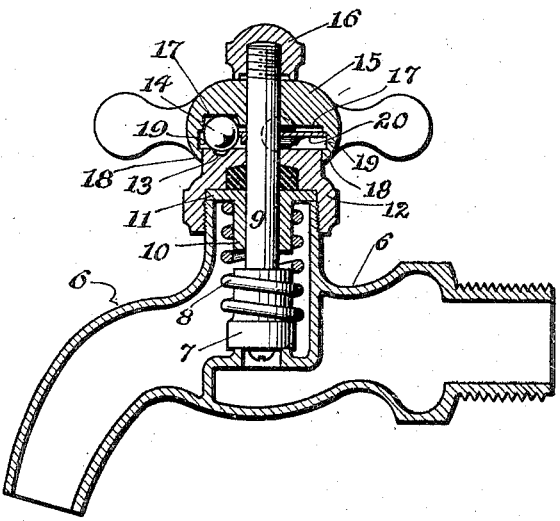
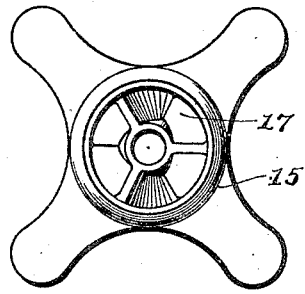
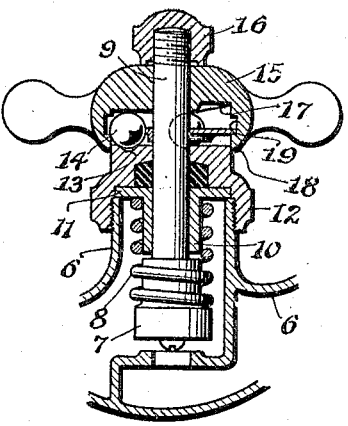
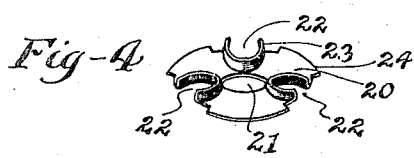
Witness
Harold Forsberg
Inventor
Michael B. Brown
By John A. Bommhardt
Atty

UNITED STATES PATENT OFFICE.

MICHAEL B. BROWN, OF CLEVELAND, OHIO.

SELF-CLOSING FAUCET.

1,229,579. Specification of Letters Patent. Patented June 12, 1917.

Application filed September 28, 1916. Serial No. 122,590.

*To all whom it may concern:*

Be it known that I, MICHAEL B. BROWN, citizen of the United States, residing at Cleveland, in the county of Cuyahoga and State of Ohio, have invented certain new and useful Improvements in Self-Closing Faucets, of which the following is a specification.

This invention relates to self closing faucets in which a valve is closed by a spring and is opened or lifted by means of a cap on the valve stem in which cap are inclosed balls which ride up and down inclined walls or surfaces on the cap or handle, when the latter is turned, the balls being retained in position by means of a retaining disk.

The object of the invention is to provide an improved device in which the balls will be retained in the handle or cap under all conditions, that is, whether on or off the stem, whereby accidental loss of parts is prevented when the cap is removed. The retainer also acts to space the balls in proper position to coöperate with the inclines. The construction is such that the balls can be replaced without removing the retainer from the cap, the retainer, however, being free to turn relatively to the cap as the latter is operated to open or close the valve.

In the accompanying drawings—

Figure 1 is a section of the faucet in closed position.

Fig. 2 is a similar view, open.

Fig. 3 is an inner face view of the cap handle.

Fig. 4 is a perspective of the ball retainer.

Referring specifically to the drawings, 6 indicates the body of the faucet, and 7 a valve therein pressed to its seat by a spring 8, the valve having a stem 9 which works in a sleeve 10 having at its upper end a flange 11 which rests on the valve body and is held in place by a bonnet 12 screwed on the body. The top of this bonnet has seats or recesses 13 in which the balls 14 rest. These balls are held within a cap or cupped handle 15 secured to the valve stem by a nut 16. The handle may be turned in either direction to open or close the valve.

The inner or under face of the cap has double inclined ball ways or surfaces 17, to which the balls correspond in number and position. Three are ordinarily used. The lower edge of the cap depends or extends around the bonnet as indicated at 18, and the inner wall thereof has an annular groove 19 to hold the ball retainer. This retainer comprises a sheet metal plate 20 having a central opening 21 for the valve stem and provided with cages 22 for the balls, these cages being formed by striking up the edge of the metal around each recess, as indicated at 23. The rim 24 of this disk or plate extends sufficiently to engage in the groove 19, the flexibility of the disk permitting it to be pressed or snapped into the groove, which is of slight depth, and it may be pried out by the use of any convenient instrument. The groove is somewhat wider than the thickness of the disk, which permits the cap to move up or down to a limited extent, with respect to the risk.

Normally, however, the ball retainer holds its place in the cap, and the balls are thereby held in position, to contact with the ways 17, although the cap may be turned with respect to the retainer, when the valve is operated, the rim of the retainer sliding around in the groove 19 to the necessary extent. The flanges 23 are flexible enough to permit the balls to be snapped in, or pried out, without removing the retainer.

In operation, the pressure of the spring 8 normally seats the valve, the balls traveling to the bottom points of the cam surfaces 17. By turning the handle, the inclined surfaces ride upon the balls, which are held in relatively stationary position in the recesses 13, causing the valve stem to lift against the tension of the spring 8, to open the valve. By removing the nut 16 the cap handle may be lifted off, and the retainer and balls will come with it, by reason of the engagement of the former in the groove 19 and the grip of the flanges 23 on the under part of the balls. There is thus no danger of the balls falling out and becoming lost, and new balls can be inserted without taking out the retainer, or if it should be desired to remove the retainer it can be done by inserting a tool in the central hole and prying the same upwardly. The device may thus be quickly assembled, and may be made at relatively small cost.

What I claim as new is:

In a self closing faucet, in combination, a valve and its stem, a rotary cupped handle on the stem, having inclined ball ways, and an annular groove in the wall of said cup, balls resting against said ways, and a ball retainer in said cup comprising a single sheet of spring metal having notches in its edge to receive the balls and flexible rim portions between the notches and engaging with a snap action in the groove.

In testimony whereof, I do affix my signature in presence of two witnesses.

MICHAEL B. BROWN.

Witnesses:
JOHN A. BOMMHARDT,
ROBERTSON BOWIE.